US008924423B2

(12) United States Patent
Hodgkinson et al.

(10) Patent No.: US 8,924,423 B2
(45) Date of Patent: Dec. 30, 2014

(54) METADATA RECORD GENERATION

(71) Applicant: Adelphoi Limited, London (GB)

(72) Inventors: Charles Hodgkinson, London (GB); Kirk Zavieh, London (GB)

(73) Assignee: Adelphoi Limited, London (GB)

( * ) Notice: Subject to any disclaimer, the term of this patent is extended or adjusted under 35 U.S.C. 154(b) by 0 days.

(21) Appl. No.: 13/948,874

(22) Filed: Jul. 23, 2013

(65) Prior Publication Data

US 2013/0311512 A1 Nov. 21, 2013

Related U.S. Application Data

(63) Continuation of application No. 12/899,971, filed on Oct. 7, 2010, now Pat. No. 8,521,779.

(60) Provisional application No. 61/250,227, filed on Oct. 9, 2009.

(51) Int. Cl.
*G06F 17/30* (2006.01)
(52) U.S. Cl.
CPC .... *G06F 17/30023* (2013.01); *G06F 17/30017* (2013.01); *G06F 17/30743* (2013.01)
USPC ............ 707/791; 707/802; 707/822; 707/828
(58) Field of Classification Search
CPC ....................................................... G06F 17/30
USPC ................................................. 707/600–899
See application file for complete search history.

(56) References Cited

U.S. PATENT DOCUMENTS 3,919,479 A 11/1975 Moon et al.
4,843,562 A 6/1989 Kenyon et al.
(Continued)

FOREIGN PATENT DOCUMENTS

EP 2083546 7/2009
WO 02/11123 2/2002
(Continued)

OTHER PUBLICATIONS

Jaap Haitsma, et al., "A Highly Robust Audio Fingerprinting System," URL:http://ismir2002.ismir.net/proceedings/02-FP04-2.pdf, Oct. 17, 2002, XP002278848, 9 pages. [Retrieved May 4, 2004].

(Continued)

*Primary Examiner* — Isaac M Woo
(74) *Attorney, Agent, or Firm* — Meyertons, Hood, Kivlin, Kowert & Goetzel, P.C.

(57) ABSTRACT

A computer implemented method and system provide for automatic selection and extraction of metadata and media content from projects in a craft tool. Automated identification, classification and management of such metadata and content is provided using including techniques such as pattern recognition for audio and visual content. The automatic tracking and centralized storage of metadata and content for compliance purposes can be facilitated, and can enable querying of organized metadata stored in a central database. In an example, metadata and media content are extracted automatically from a project in a craft tool at a client system and are forwarded to a host system for the creation of a cue sheet including timings for media files from timing metadata in a project file to create the timings on the cue sheet.

20 Claims, 9 Drawing Sheets

(56) References Cited

U.S. PATENT DOCUMENTS

| | | | |
|---|---|---|---|
| 5,019,899 | A | 5/1991 | Boles et al. |
| 5,210,820 | A | 5/1993 | Kenyon |
| 6,941,275 | B1 | 9/2005 | Swierczek |
| 7,346,472 | B1 | 3/2008 | Moskowitz et al. |
| 7,660,700 | B2 | 2/2010 | Moskowitz et al. |
| 7,949,494 | B2 | 5/2011 | Moskowitz et al. |
| 8,214,175 | B2 | 7/2012 | Moskowitz et al. |
| 2001/0041050 | A1 | 11/2001 | Iwata et al. |
| 2002/0161741 | A1 | 10/2002 | Wang et al. |
| 2003/0086341 | A1 | 5/2003 | Wells et al. |
| 2003/0212613 | A1 | 11/2003 | Sarig |
| 2005/0038819 | A1 | 2/2005 | Hicken et al. |
| 2006/0044957 | A1 | 3/2006 | Ellis |
| 2006/0122986 | A1* | 6/2006 | Sohma ............... 707/3 |
| 2006/0229878 | A1 | 10/2006 | Scheirer |
| 2008/0034029 | A1 | 2/2008 | Fang et al. |
| 2008/0091366 | A1 | 4/2008 | Wang |
| 2009/0051487 | A1 | 2/2009 | Sarig et al. |
| 2009/0083281 | A1 | 3/2009 | Sarig et al. |
| 2009/0202220 | A1 | 8/2009 | Sarig |
| 2009/0217352 | A1 | 8/2009 | Shen et al. |
| 2010/0017502 | A1 | 1/2010 | Cheng et al. |

FOREIGN PATENT DOCUMENTS

| | | |
|---|---|---|
| WO | 02/27600 | 4/2002 |
| WO | 02/061652 | 8/2002 |
| WO | 03/091990 | 11/2003 |
| WO | 2004/046909 | 6/2004 |
| WO | 2005/079499 | 9/2005 |
| WO | 2006/028600 | 3/2006 |
| WO | 2008/042953 | 4/2008 |
| WO | 2008/143768 | 11/2008 |

OTHER PUBLICATIONS

"Advanced Design Approach for Personalised Training. Interactive Tools," Cordis simple search, Feb. 1, 2000-3 Oct. 31, 2002, URL: http://cordis.europa.eu/search/index.cfm?fuseaction=proj.document&PJ_RCN=541 0050, 3 pages. [Retrieved Dec. 4, 2012].
Dan Boneh and James Shaw, "Collusion-Secure Fingerprinting for Digital Data," Advances in Cryptology, Proceedings from the 15th Annual International Cryptology Conference, Aug. 27-31, 1995, vol. 963, pp. 452-465.
P. Alshuth, et al., "IRIS—A System for Image and Video Retrieval," Proceedings of the 1996 Conference of the Centre for Advanced Studies on Collaborative Research, 1996, 13 pages.
R. Mohan, "Video Sequence Matching," Proceedings of the 1998 IEEE International Conference on Acoustics, Speech and Signal Processing, vol. 6, May 12-15, 1998, pp. 3697-3700.
Edward Remias, et al., "Block-Oriented Image Decomposition and Retrieval in Image Database Systems," Proceedings of International Workshop on Date of Conference Multimedia Database Management Systems, Aug. 14-16, 1996, pp. 85-92.
K. Curtis, et al., "A Comprehensive Image Similarity Retrieval System that utilizes Multiple Feature Vectors in High Dimensional Space," Proceedings of 1997 International Conference on Information, Communications and Signal Processing, Sep. 9-12, 1997, vol. 1, pp. 180-184.
Shih-Fu Chang, et al., "A Fully Automated Content-Based Video Search Engine Supporting Spatiotemporal Queries," IEEE Transactions on Circuits and Systems for Video Technology, vol. 8, Issue 5, Sep. 1998, pp. 602-615.
S.R. Subramanya, et al., "Wavelet-based Indexing of Audio Data in Audio/Multimedia Databases," Proceedings International Workshop on Multi-Media Database Management Systems, Aug. 5-7, 1998, pp. 46-53.
J. L. Flanagan, et al., "Phase Vocoder," The Bell System Technical Journal, Nov. 1966, pp. 1493-1509.
Alan V. Oppenheim, "Speech spectrograms using the fast Fourier transform," reprinted from IEEE Spectrum, vol. 7, No. 8, Aug. 1970, pp. 57-62.
Jont B. Allen, et al., "A Unified Approach to Short-Time Fourier Analysis and Synthesis," Proceedings of the IEEE, vol. 65, No. 11, Nov. 1977, pp. 1558-1564.
Steven B. Davis, et al., "Comparison of Parametric Representations for Monosyllabic Word Recognition in Continuously Spoken Sentences," IEEE Transactions on Acoustics, Speech, and Signal Processing, vol. ASSP-28, No. 4, Aug. 1980, pp. 357-366.
Robert C. Maher, "Fundamental frequency estimation of musical signals using a two-way mismatch procedure," Journal of Acoustical Society of America, vol. 95, No. 4, Apr. 1994, pp. 2254-2263.
Pedro Cano, et al., "A Review of Algorithms for Audio Fingerprinting," IEEE Workshop on Multimedia Signal Processing, 2002, pp. 169-173.
J. A. Haitsma, "Audio Fingerprinting: "A New Technology to Identify Music,"" Faculty of Electrical Engineering of the Eindhoven University of Technology: Section Design Technology for Electronic Systems (ICS/ES)—ICS-ES 801, Master's Thesis, Nat.Lab. Unclassified Report 2002/824, Aug. 13, 2002, 36 pages.
European Search Report in Application No. 10186994.9-2223 mailed Jan. 25, 2011, 3 pages.
Response to Extended European Search Report in Application No. 1018994.9 dated Jan. 25,2011, mailed Oct. 24, 2011, 5 pages.
International Search Report and Written Opinion in Application No. PCT/GB2011/051042 mailed Sep. 14, 2011, 12 pages.
Extended European Search Report in Application No. 14162490.8 mailed Jul. 24, 2014, 11 pages.
Office Action in U.S. Appl. No. 13/948,910 mailed May 14, 2014, 8 pages.
Partial European Search Report in Application No. 14162490.8 mailed May 16, 2014, 7 pages.

* cited by examiner

METADATA RECORD GENERATION

CROSS REFERENCE TO RELATED APPLICATIONS

The present application is a continuation of U.S. Utility application Ser. No. 12/899,971, filed Oct. 7, 2010, which claims priority to U.S. Provisional Application No. 61/250,227, filed Oct. 9, 2009, both of which are incorporated by reference in their entireties.

TECHNICAL FIELD

The invention relates to methods and apparatus for the automatic identification and selection of metadata from media craft tools.

BACKGROUND

The term "craft tool" as used herein is a computer-implemented tool for audio and/or visual editing and/or broadcast purposes. Examples craft tools include, for example, editing software used to edit audio and/or visual productions (projects), e.g. film editing, programme editing. Other examples of craft tools include so-called sequencers that are normally used for audio-only productions. Other examples of craft tools include tools for broadcast automation that enable audio and video cues to be cued-up and played according to a schedule or when triggered from a control panel.

The term "project" as used herein refers to an audio or audio-visual production, for example a particular cut of a film, or an episode of a TV programme, or a mix of a song or a production going to air. A project file within a craft tool is a central file in which all the information about a particular audio or audio-visual production is stored and points at the media files that are used in the project.

The term "sequence" as used herein, and as typically used in craft tool terminology, refers a particular edit within a project. For example, if the project is a given film, then examples of sequences (edits) might be a pre-watershed version, the trailer version, the director's cut etc.

The term "metadata" as used herein refers to any information of whatever form relating to a project or a sequence for a project. Examples of metadata include: a project name; a creator name; names of media files used in the project; technical information about the media files used in a project such as bit depth, sample rate, global positioning system (GPS) location, exposure, etc.; timing data about where and how each media file is cut and edited into the programme; process data: settings information about how sections of audio or video have been processed (e.g. visual effects); free text or customized fields that an editor types in or imports into a project; map and/or GPS data; audio levels data; graphics data; colour data; rights data.

The term "content" is herein to refer to media held in a media file. A media file can contain content in the form of raw audio, video footage, image, graphics, etc. The content in the media files are loaded into the craft tool by an editor operating the craft tool in order to create a project.

An editor may have used music tracks in his production. The editor normally has a compliance obligation to make a list of all the music used, with the times in and out, and a list of all other associated fields which show the identities and ownership stakes of the interested parties in each piece of music; composer, publisher, arranger etc. Such a list of music with all the associated metadata is commonly known as a cue sheet. It is a significant overhead for an editor to identify the piece of music used, then to find out and attach the metadata for that music, and then to organise the meta data into a cue sheet format.

Most craft tools can export a standard edit decision list (EDL file) which can then be automatically interrogated to find the filename of each music file used and the timing of when it was used in the production. Automated "EDL-to-cue sheet" software is available that uses filenames to lookup against a database of music titles and their associated metadata, thereby avoiding the need for the editor to have to find that information.

However, an approach using such automated EDL-to-cue sheet software relies on the file name of the music track as used by the editor in the project being exactly the same as the file name in the look-up database. This is a problem since the editor may use an abbreviation, or may not be aware of the name that is in a database. For example, the editor might refer to a Madonna track as Madi1, whereas the database of metadata could use a totally different name.

Also, before an editor can create an EDL file from a project, the editor has to carry out a lot of time-intensive and error-prone organisation in the craft tool so that the EDL includes all the information that is relevant to a cue sheet. (e.g., voiceover and other musical tracks must be weeded out and audio tracks must be arranged in a particular way for the EDL export functions to work)

BRIEF DESCRIPTION OF THE DRAWINGS

Embodiments of the invention are described hereinafter, by way of example only, with reference to the accompanying drawings.

DETAILED DESCRIPTION

Figure 1:
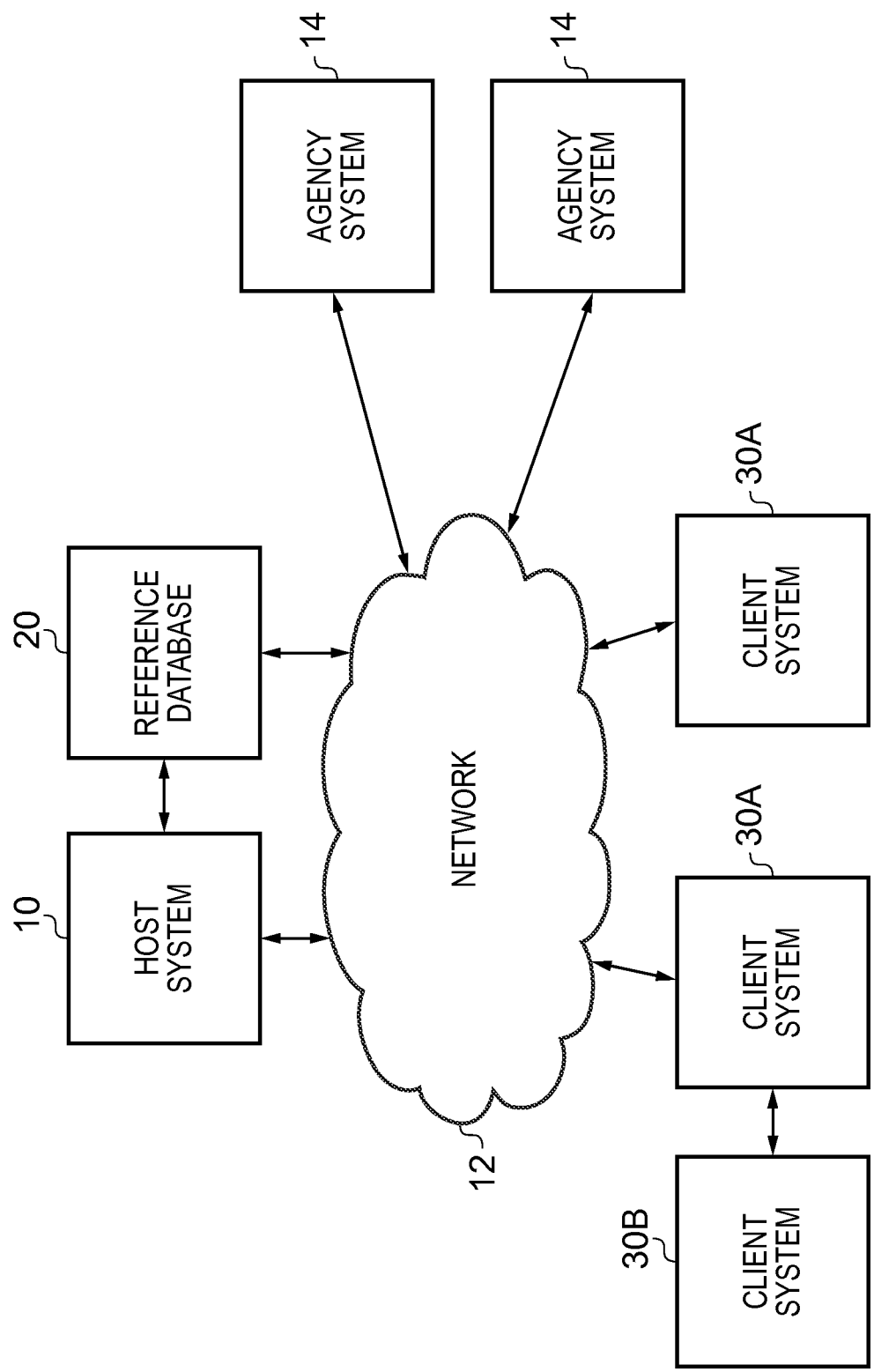
FIG. 1 is a schematic overview of a system in which an embodiment of the invention can be implemented.

An embodiment of the invention enables the automatic selection and extraction of metadata and media content from projects in a craft tool. An embodiment of the invention can provide for the automated extraction of such data for purposes of identification, classification and management of such metadata and content using automated identification techniques including, for example, pattern recognition of content, for example audio and visual content. An embodiment of the invention can facilitate the automatic tracking and centralised storage of metadata and content for compliance and other purposes, and can enable querying of organised metadata stored in a central database. An embodiment of the invention enables metadata and media content to be extracted automatically from a project in a craft tool at a client system and to be forwarded to a host system for processing, including, for example, the creation of a cue sheet including timings for media files from timing metadata in a project file to create the timings on the cue sheet.

The term "data extraction module" as used herein refers to an application that is provided for a craft tool. Different versions of the data extraction module can be configured to access the metadata and the content in a project created by an editor within a given craft tool. Each individual data extraction module version provides the same set of functionalities, although the respective versions are adapted to the structure of the metadata and content for each craft tool and the platform on which the craft tool is implemented, for example OS X, Windows, Linux etc.

The data extraction module can be configured as a standalone application (i.e. to be run as stand alone program) or may be more configured as a plug-in integrated into the menu structure of a craft tool such that is can be triggered from within a menu in the craft tool.

An example embodiment of a system incorporating the data extraction module can employ pattern recognition to determine metadata for content from a project.

An embodiment of the invention does not depend solely on filenames and other metadata in a project in a craft tool but it is also operable automatically to analyse content in the project in order automatically to generate and/or to verify metadata. In an example embodiment pattern recognition is used to analyse the content. In one example embodiment, for instance, pattern recognition is used to enable automatic cue sheet generation as follows:

A data extraction module is operable to identify content, for example audio content, in respective media files of a project and to generate a fingerprint of content of each media file. The data extraction module generates an export file that contains the fingerprints and metadata extracted from the project. The export file is then delivered to a host server. The host server is operable to compare fingerprint(s) in the export file to reference fingerprints held in a database of source tracks and associated metadata using conventional and/or proprietary pattern recognition techniques to identify metadata corresponding to the extracted content from the project. The metadata identified by comparing the fingerprints can be compared to the metadata extracted from the project to verify the metadata extracted from the project and can be added to the metadata extracted from the project to form a cue sheet that can be imported into a cue sheet view for reporting to performing rights societies.

The present approach differs from conventional audio recognition systems than listen to a soundtrack of a completed programme (typically when it is broadcast) in which the audio recognition for music reporting is adapted to recognise music with layers of voiceover and special effects etc. on top of it. Limitations in the conventional techniques caused by the need to take account of such additional "noise" impacts on the efficiency and accuracy of such audio recognition systems, and can prevent such systems being used to accurately identify timings of music excerpts with voiceovers, fades, etc. In contradistinction thereto, as an embodiment of the invention acts on individual content media files in individual tracks within a project, audio recognition can be made more efficient and accurate. Also combining audio recognition with metadata from the project relating to timings of the media content files within the tracks of the project enables more accurate determination of timings within the project. The advantages provided by an embodiment of the invention apply to all types of media, not just audio.

An example embodiment is described in more detail, by way of example only, with reference to the drawings.

FIG. 1 is schematic representation of an overview of a system.

The system shown in FIG. 1 includes a host system 10 connected to a network 12, for example the Internet. The host system can be implemented by one or more computer server systems. The host system 10 is configured to access a reference database 20. The reference database 20 can be integral to or separate from the host system 10. Where the reference database 20 is separate from the host system 10, the reference data base can be implemented by a computer database system and the host system 10 can be configured to access the reference database 20 directly, or via the network 12. FIG. 1 shows a plurality of client systems 30A and 30B. A client system can be implemented by one or more computer systems. The client systems 30A are connected to the network 12, and the client system 30B is a stand-alone system. A client system 30 includes a craft tool and a data extraction module that is operable to identify content in respective media files of a project, to generate a fingerprint of the content of each media file and to create a file to export to the host system 10. FIG. 1 also shows a plurality of agency systems 14 that are connected to network 12. An agency system 14 can be implemented by one or more computer servers and can be operated by an organisation such as a performing right society. The host system 10 is operable to receive and process files exported from the client systems 30. The processing includes comparing fingerprint(s) in the exported file to reference fingerprints held in a database of source tracks and associated metadata to identify metadata corresponding to the extracted content from the project and generating cue sheets for submission to one or more of the agency systems 14.

Figure 2A:
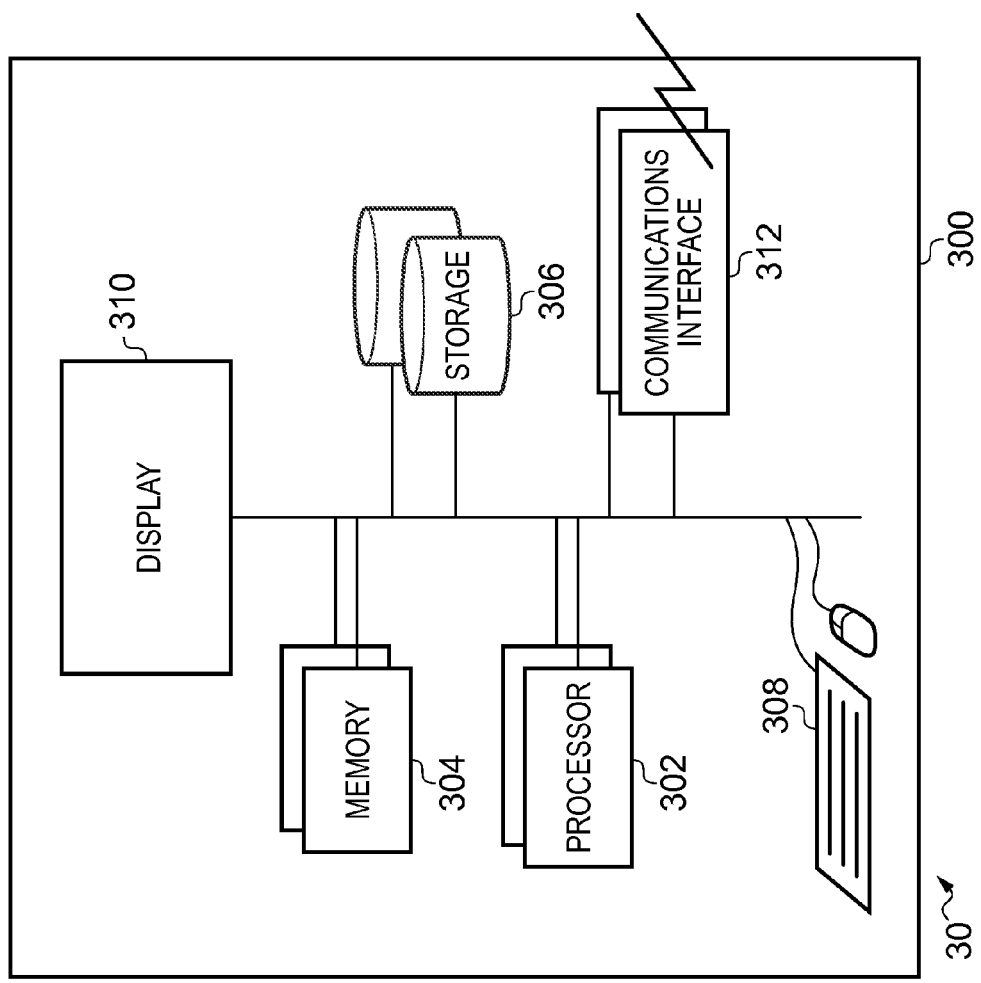
FIG. 2A is a schematic block diagram of a client system.

FIG. 2A is a schematic block diagram of an example configuration of a client system 30. The client system can be implemented using one or more computer systems 300, each of which can include conventional computer components including, for example, one or more processors 302, memory 304 and storage 306, one or more user input devices 308, one or more displays 310, one or more communications interfaces 312, etc.

Figure 2B:
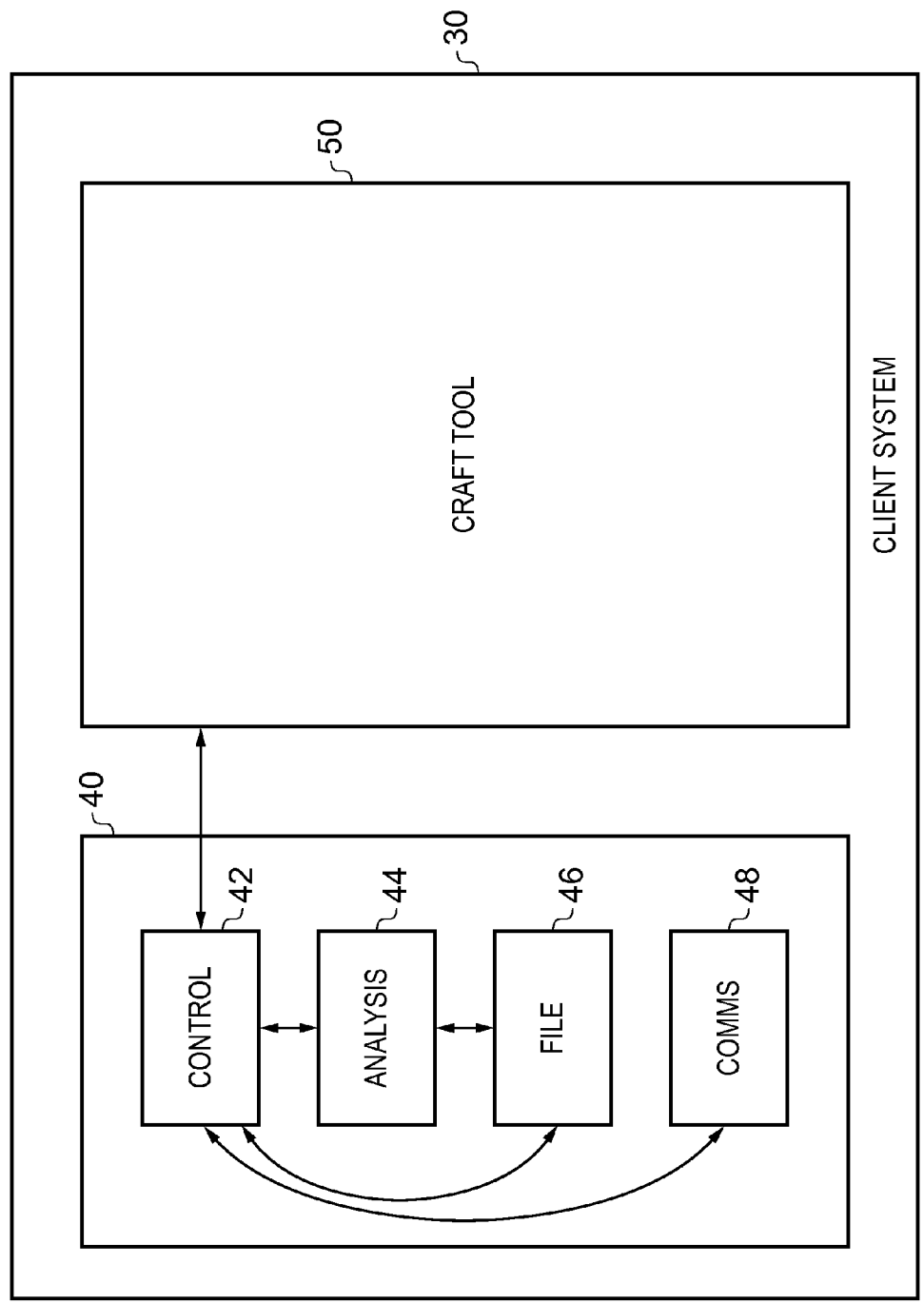
FIG. 2B is a schematic block diagram representing functional components of the client system.

FIG. 2B is a schematic representation of functional components of the client system 30. As shown in FIG. 2B, the client system 30 includes a craft tool 50. As mentioned earlier, the craft tool 50 can be implemented as a computer-implemented tool for audio and/or visual editing and/or broadcast purposes. The craft tool 50 can include computer program code to be held in the memory 304 and/or storage 306 in the client system 30. The computer program code of the craft tool 50 can be operable when executed on the one or more processors 302 to carry out tasks defined by the craft tool program code. The term craft tool can comprise editing software for editing audio and/or visual productions (projects).

The client system 30 also includes a data extraction module 40. The data extraction module 40 can be implemented as a computer software product, for example as an application separate from the craft tool or as a plug-in for the craft tool 50. The data extraction module 40 can include computer program code to be held in the memory 304 and/or storage 306 in the client system 30. The computer program code of the data extraction module 40 can be operable when executed on the one or more processors 302 to carry out tasks defined by the data extraction program code. The data extraction module 40 is configured to interact with the craft tool 50 for accessing metadata and content held in files in a project defined by the craft tool 50, taking into account the structure of the metadata and content for the craft tool and the platform on which the craft tool is implemented, for example OS X, Windows, Linux etc.

The data extraction module 40 provides a plurality of different functions represented schematically by a control module 42, an analysis module 44, a file module 46 and a communication module 48. The control module 42 is operable to control the operation of the data extraction module 40 and to access metadata and content from the craft tool 50. In various embodiments the data extraction module 40 can be operable to access the metadata and content from the craft tool 50 either directly, or via one or more layers of abstraction, for example via an API provided by the craft tool 50. The control module 42, analysis module 44, file module 46 and communication module 48 can be implemented as computer software (computer program code) held in memory or storage in the client system that is operable to control the processor(s) 300 of the client system to carry out the process described with reference to FIG. 5.

Figure 3:
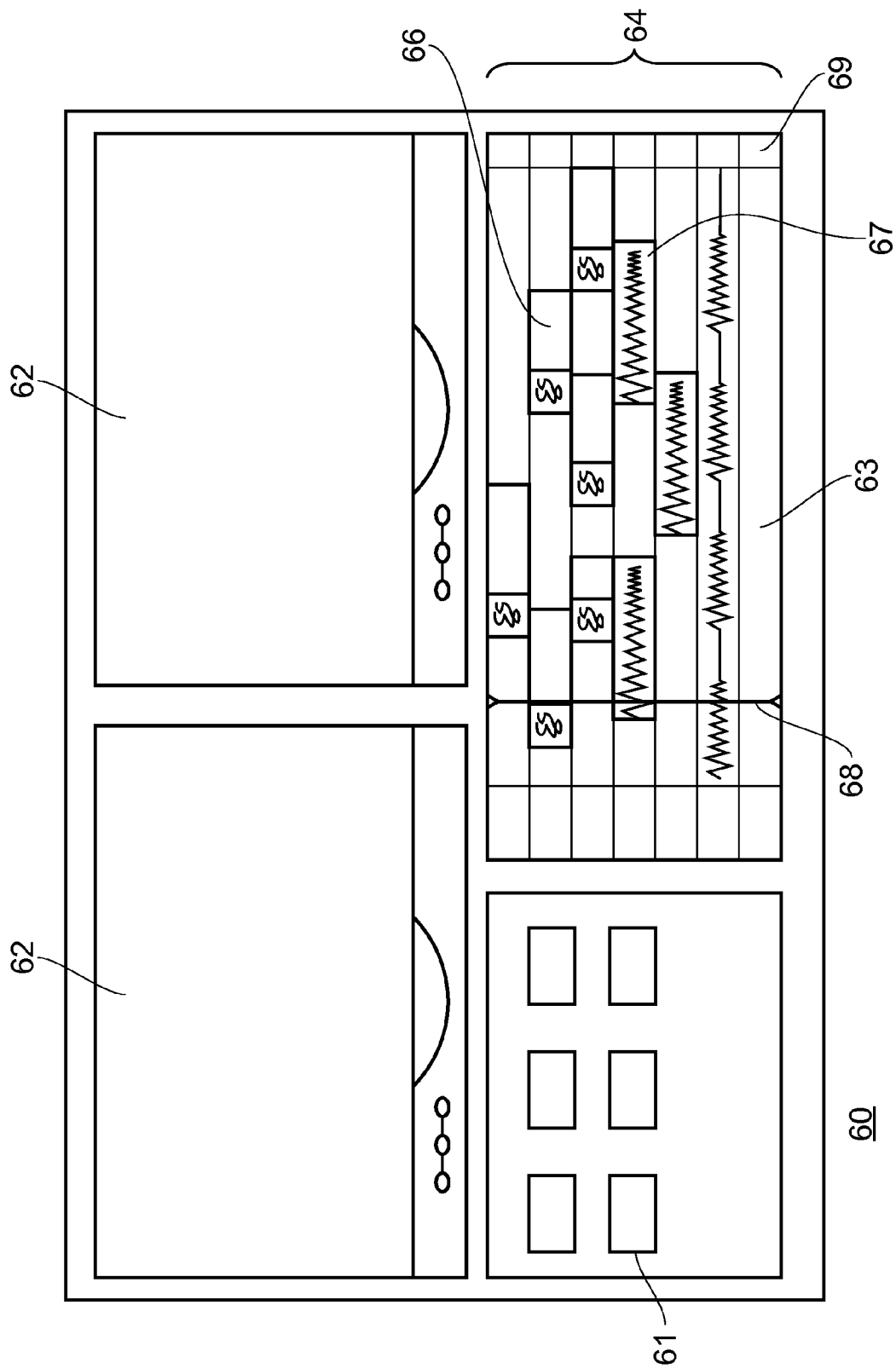
FIG. 3 is a schematic representation of a graphical interface of a craft tool.

FIG. 3 is a schematic representation of an example of a graphical display interface 60 that the computer program code of an example craft tool 50 can cause the one or more processors 302 to display on a display 310 of the client system 30. The graphical display interface 60 can be used by an editor as a control interface for controlling the craft tool 50. As shown in the upper part of FIG. 3, first and second panes 62 are used for displaying video information during editing. A control pane 61 is used to select projects on which the editor is to work and a project pane 63 display details of a project. The details of a project are represented as a set of media items in the form of tracks 64 containing content, for example video content 66 and audio content 67. The media items can be stored as files, or records, in the memory 304 and/or storage 306 of the client system 30. The project pane 63 displays the timing of the content with respect to a timeline and a particular point in time can be identified by a timing cursor 68. Various controls are available to the editor (e.g., via control buttons 69) for entering and viewing metadata relating to the content displayed on the project pane 63.

Figure 4:
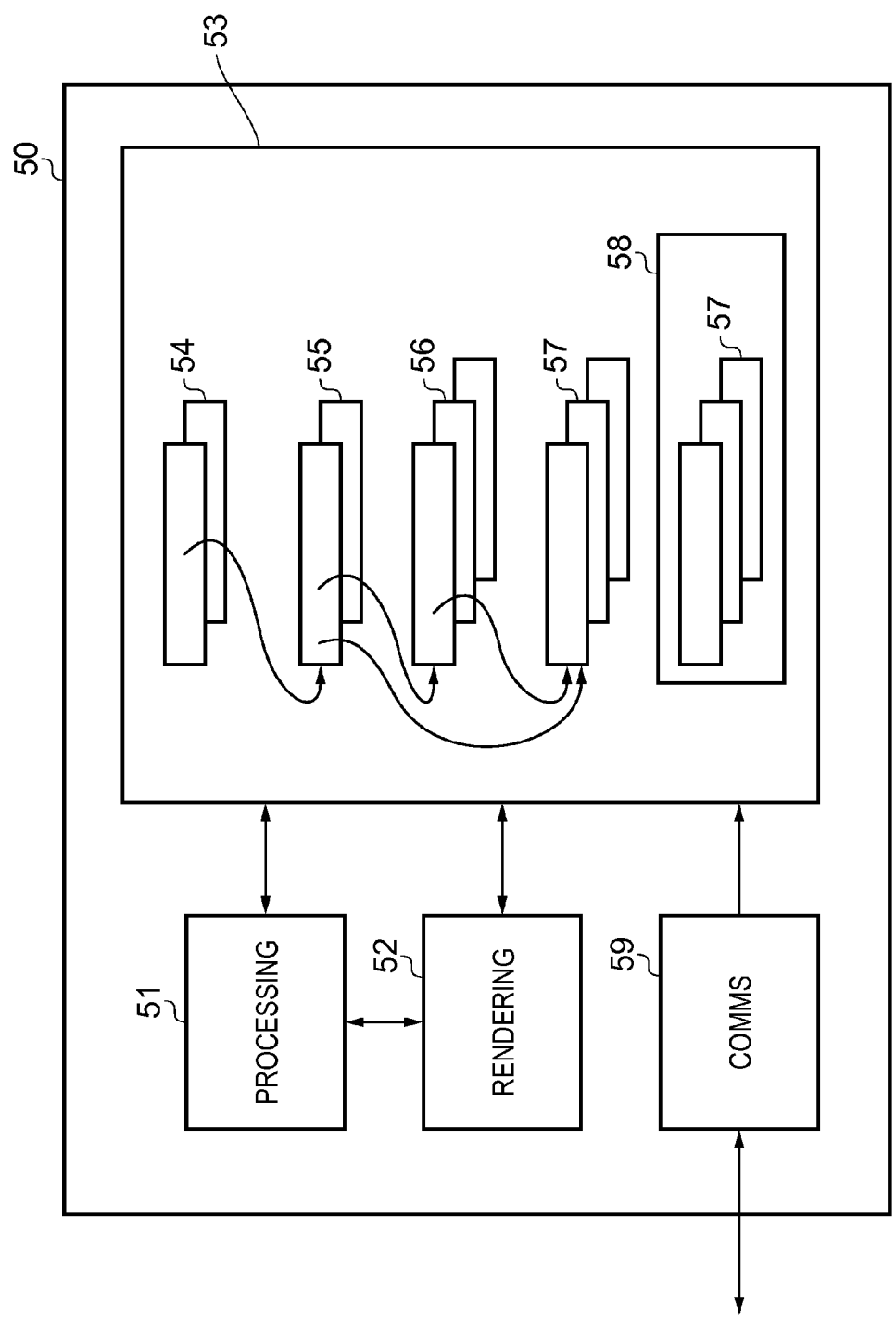
FIG. 4 is a schematic block diagram representing functional components of a data extraction module.

FIG. 4 is a schematic block diagram of functional components of an example of a craft tool 50. The craft tool comprises a processing module 51 that includes computer program code that defines a file structure 53 to be stored in the memory 304 and/or storage 306 of the client system. A rendering module 52 includes computer program code that is operable to generate the graphical representation illustrated in FIG. 3 based on the file structure 53. As illustrated in FIG. 4, the file structure comprises one or more project items defining one or more projects. Each project item 54 identifies the content of the project. In the example shown, a project item 54 identifies, or points to, one of more sequence items 55 relating to each project 54. In the example shown, each sequence item 55 identifies a plurality of tracks 56 with which media items are associated. In the example shown, each sequence item 55 identifies one or more media items 57 associated with the sequence and with the respective tracks 56. The media content of each media item 57 can be one of a video, image, text, audio media item. Each media item 57 can be associated with one or more timings within one or more of the tracks 56. In the present example, the timing metadata is held in the sequence items 55 along with pointers to the content items 57. FIG. 4 also illustrates a media bin 58 that contains media content item 57, for example media content items that have been discarded by the editor. It is to be noted that the file structure shown in FIG. 4 is a schematic representation only, and that different craft tools implement a file structure in different ways.

The file structure 53 can be implemented using respective files for the items identified, using an object-based structure, using a mark-up language such as XML, or in any other suitable manner. Indeed, different craft tools implement a file structure in different ways.

The craft tool 50 can also include a communications module 59 that is configured to provide an interface for accessing the file structure 53. The communications module 59 can be in the form of computer program code defining an application programming interface (API).

As indicated, the processing module 51, rendering module 52 and the communications module 58 can be implemented as computer software held in the memory 304 and/or storage 306 in the client system, the computer software being operable to control the processor(s) of the client system. The file structure 53 can be held in the memory 304 and/or storage 306 in the client system.

Figure 5:
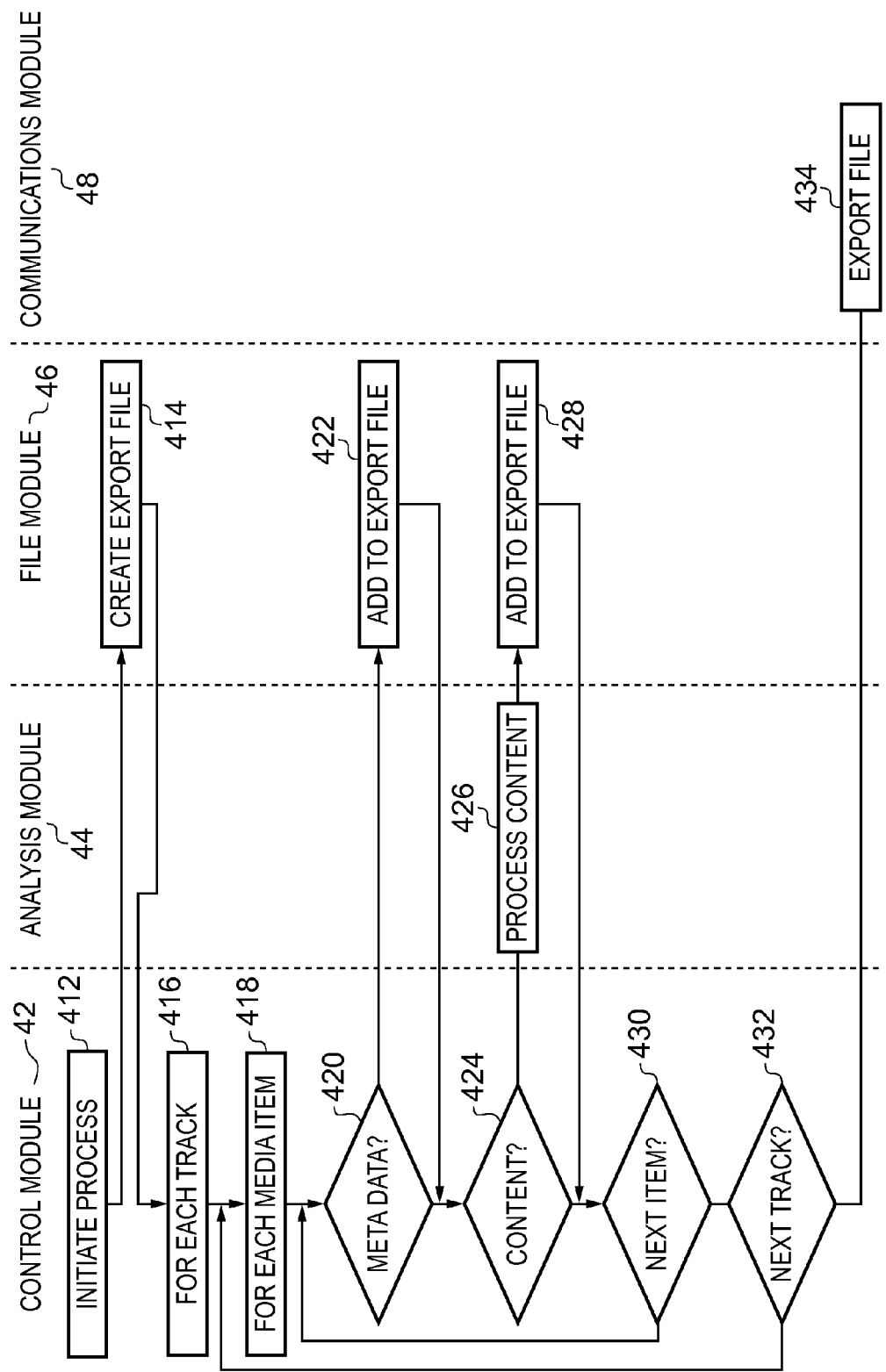
FIG. 5 is a flow diagram illustrating an example operation flow for the data extraction module.

FIG. 5 is a flow diagram illustrating an example operation 410 of the data extraction module 40.

The data extraction module 40 can be initiated in step 412 by an editor. If the data extraction module is configured as a plug-in for the craft tool 50, the data extraction module 40 can be initiated using a menu item in the craft tool 50. Alternatively, if it is implemented as a separate application, then the application can be initiated. The data extraction module 40 could alternatively be initiated automatically, for example by reaching a given stage in operation of the craft tool. After initiation, the operation of the data extraction module proceeds in an automatic manner.

In step 414, the file module 46 creates a project file for the project sequence.

The control module 42 then processes the media items 57. In the present example, as illustrated in FIG. 5, the control module 42 loops 416 for each track 56 and, within each track, extracts 418 each media item 57.

If the control module 42 identifies 420 that the data item 57 contains metadata, then the file module 46 adds 422 the metadata to the project file created in step 414.

If the control module 42 identifies 424 that the data item 57 contains content, then the analysis module 44 processes 426 the content to produce a representation (e.g., a fingerprint) of the content and the file module 46 adds 428 the processed content to the file created in step 414. In one example, the analysis module 44 can be operable to create a Fourier transform of the content as a representation of the content, and the Fourier transform is then stored as the representation of the content in the export file. In other examples, other forms of processing can be employed, for example the processing can be to directly generate metadata for the media item. Content extracted from the project 54 can also be stored in the project file instead of or in addition to the processed content. If the content is associated with metadata in the project 57, then the metadata can be associated with the content and/or processed content in the project file.

The export file can be created using a markup language, for example XML.

If 430, there are more items for the track, the process loops back to step 420.

Otherwise, if 432 there are more tracks for the project the process loops back to step 418.

Otherwise, at step 434, the communications module 48 exports the project file. The communications module 48 can be operable digitally to encrypt the project file before export. Conventional encryption technologies can be used to encrypt the project file such that confidential information contained therein is held confidential and to counter attempts potentially to corrupt the project file. The project file can be exported to the host system 10 directly if the client system (e.g., a client system 30A) is connected to the network 14. Alternatively, if the client system (e.g., the client system 30B) is not connected to the network 14, then the export file can be transferred (for example using a disk, USB memory, wired or wirelessly connection, or otherwise) to a client system 30A that that is connected to the network, from which it can be transmitted to the host system 10 via the network 14.

Figure 6A:
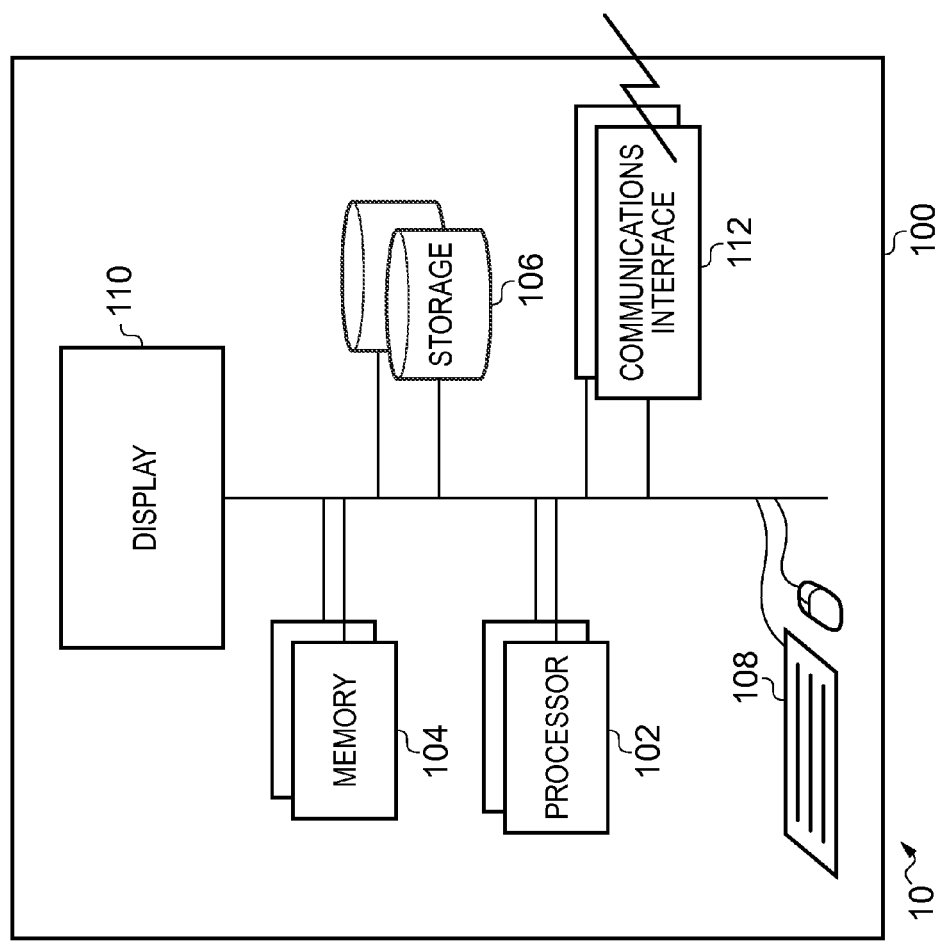
FIG. 6A is a schematic block diagram of a host system.

FIG. 6A is a schematic block diagram of an example configuration of a host system 10. The host system 10 can be implemented as one or more computer servers 100, each of which can include conventional computer components including, for example, one or more processors 102, memory 104 and storage 106, one or more user input devices 108, one or more displays 110, one or more communications interfaces 112, etc.

Figure 6B:
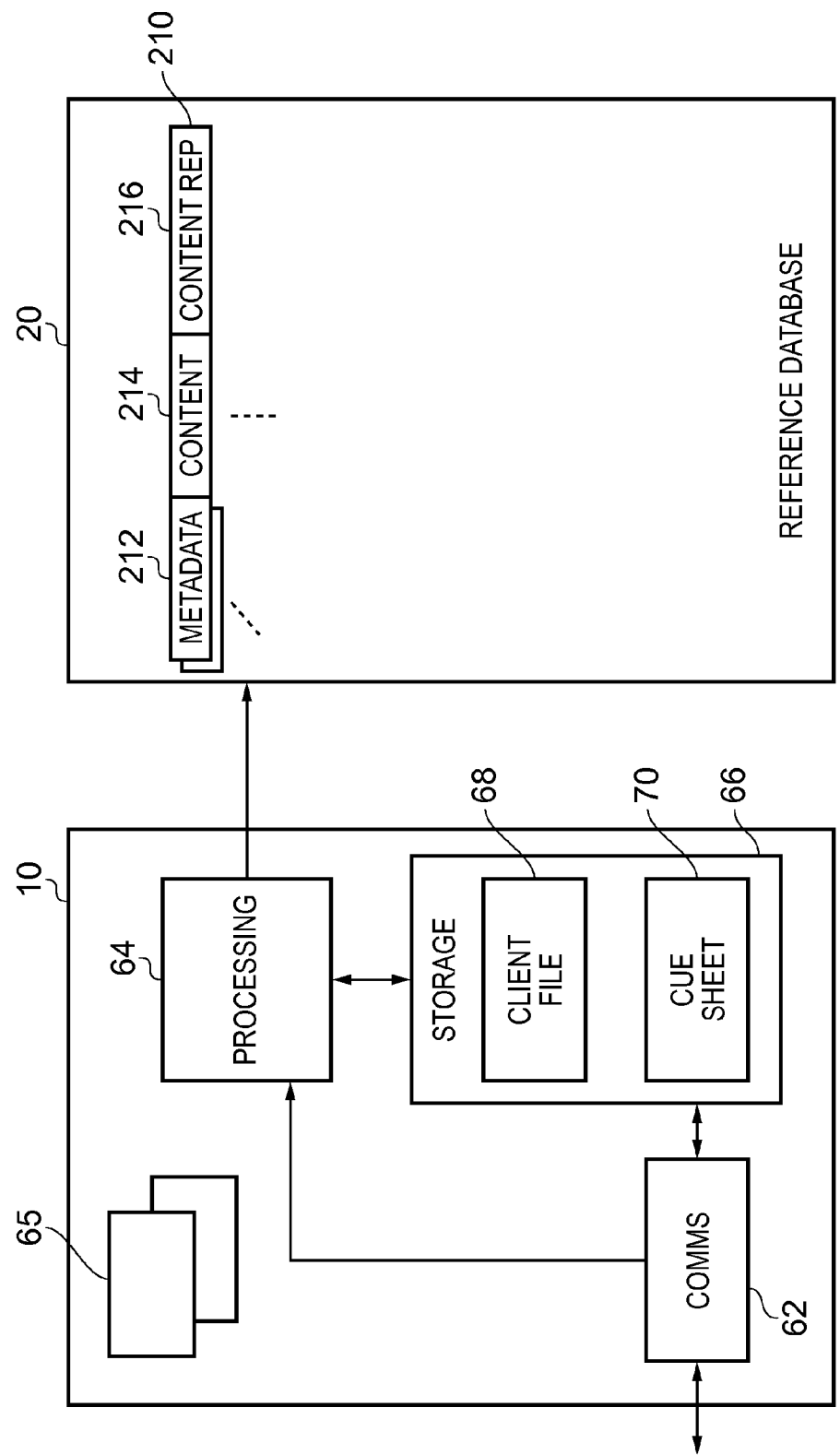
FIG. 6B is a schematic block diagram representing functional components of the host system.

FIG. 6B is a schematic representation of functional components of the host system 10. A communications interface 62 provides a connection to the network 14, a processing module 64 provides for processing export files received from client systems 30, and a data structure 66 includes received client export files 68 and generated cue sheets 70. The reference database 20 includes a file structure including items 210 defining content 214 and associated metadata 212 and content representations 216 (e.g., Fourier transforms of content). The processing module 64 can be implemented as computer software that is operable to control the processor(s) 102 of the host system 10 to carry out the process described with reference to FIG. 7. The data structure 66 can be held in the memory 104 and/or storage 106 in the host system 10, or in storage accessible to the host system 10. FIG. 6 also illustrates different versions of data extraction modules 65 that can be held in storage in memory and/or storage in the host system 10 so that an appropriate data extraction module for a client system 30 can be downloaded to the client system 30 on demand.

Figure 7:
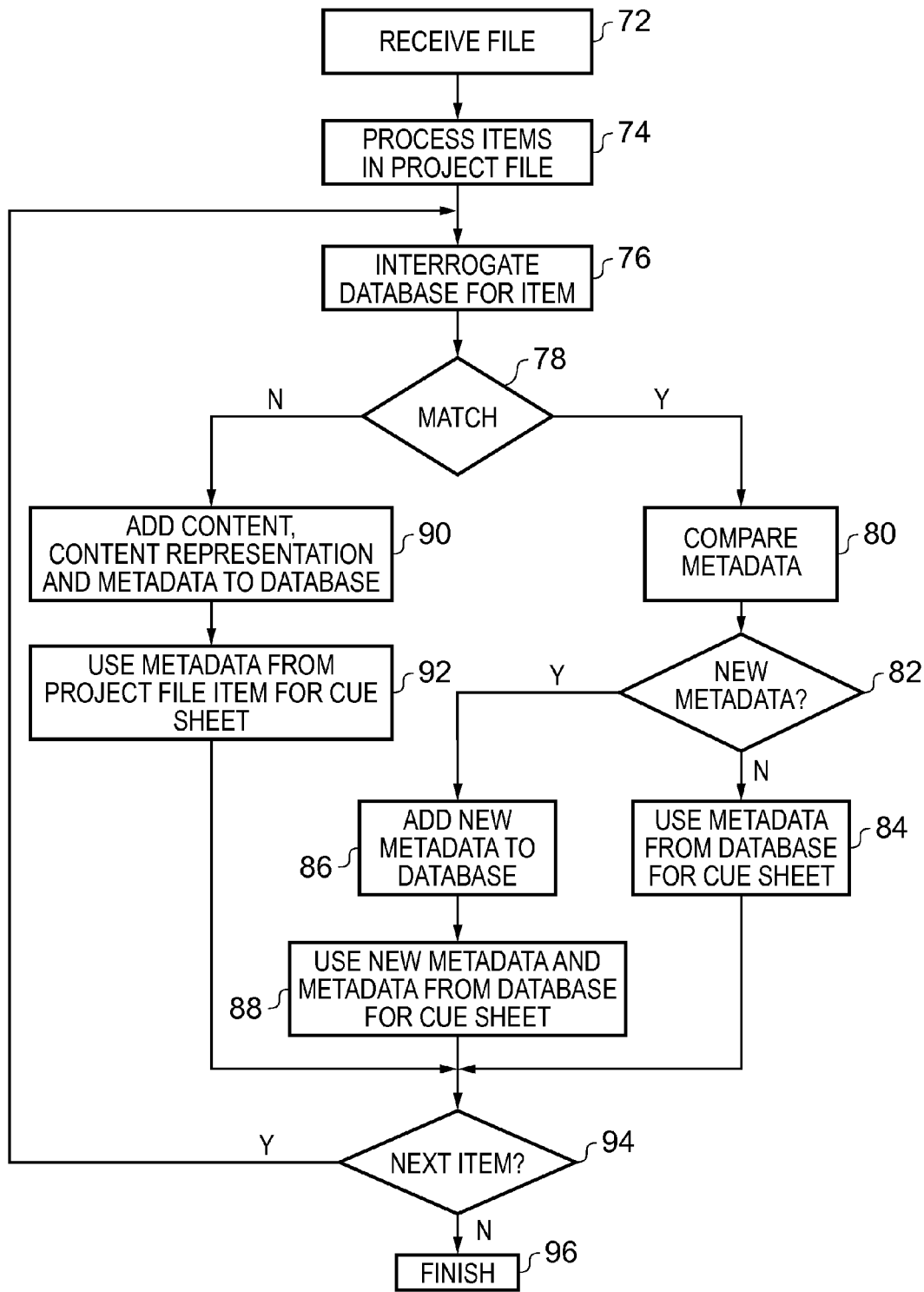
FIG. 7 is a flow diagram illustrating an example operation flow for the host system.

FIG. 7 is a flow diagram illustrating an example operation of the host system 10.

In step 72 an exported file 68 for a project, or a sequence of a project, (referred to as a project file with reference to FIG. 7) is received by the process module 64 from a client system and can be stored in the memory or storage of the host system 10. The process module 64 can be operable to decrypt a project file encrypted at the client system 30.

The process module 64 then loops 74 through the items in the project file 68.

The process module 64 interrogates 78 the database 20 using pattern recognition to determine if a match for the content representation for the item can be found.

If the process module 64 finds 80 a match, then the metadata associated with the matched entry 210 in the database 20 can be compared to any metadata of the item being processed (the current item).

If the process module 64 finds 82 that the current item in the project file does not contain any new metadata, that is metadata not already present in the database 20, then the process module 64 uses 84 the metadata 212 associated with the matched item in the database 20 for creating and/or updating a cue sheet 70 for the project.

If the process module 64 finds 82 metadata for the current item in the project file that is not found in the database 20, then the process module 64 adds the new metadata to the metadata 212, possibly by creating an additional metadata or a history field, associated with the matched item in the database 20. Then, the process module 64 uses the new metadata and any existing metadata 212 for the matched item 210 in the database 20 for creating and/or updating the cue sheet 70 for the project.

If the process module at step 78 did not find a match for the current item of the project file in the database 20, then the process module 64 adds 90 the content representation and the content and any associated metadata from the current item to the database as a new database entry. The process module 64 then uses 92 the metadata from the current item of the project file for creating and/or updating the cue sheet 70 for the project If, after steps 84, 88 or 92, the process module 64 finds 94 that there are more items in the project file, the process returns to step 76 for the next item. Otherwise, the process completes in step 96 and the cue sheet can be sent to the agency system 14.

In the above process, where reference is made to identifying a match, the match can relate to identifying the whole identity of content, for example the identity of a particular recording, or can be to identifying details within the content. For example pattern recognition could be used to identify the face of an actor in a movie and identify times within a movie that the actor appears. For example, a fingerprint (representation) of the image of an actor could be stored in the reference database along with metadata identifying the actor. Similarly, a fingerprint (representation) of the image of a product could be stored in the reference database along with metadata identifying the product. As another example, a fingerprint (representation) of the voice of a musician could be stored in the reference database along with metadata identifying the musician. Other aspects of facets of a project or project sequence can also be captured by the techniques described above. For example information can be captured automatically that can identify moods (e.g. colours, types of music or sound effects, expressions, etc.) and aspects that could lead to the identification of product placements (e.g. themes, topics of interest etc.). Also text could be identified corresponding to spoken words or images in the content, scores could be generated for music, etc. In this way, an embodiment of the invention can be used to identify details within a content item. Using timing and/or other metadata in the exported file from the client system, the process module 64 of the host system 10 is then able not only to generate cue sheets for, for example, a performing rights society, it can also be used, for example, to quantify royalties etc., opportunities for product placement and the like.

In summary therefore, using an example embodiment of the invention, a user launches a data extraction module application and browses through a data extraction module dialogue to target one or more project files created by a craft tool which holds essential information about the structure of a particular editing project. A project might contain multiple sequences—i.e. different edits of the same film.

Different versions of a data extraction module can be provided as different craft tools have a different file structures for project files: ranging from XML to flat files, from open to proprietary format, XMP, binary, audio, video etc. Also different craft tools have different organisations for the way in which a project's associated media files and content are held so that respective versions of a data extraction module can target the different structures of metadata and media files for each craft tool.

An example of the data extraction module can be configured to enable a user to select to view, listen to (audition) the media files and metadata and using the workflow of the data extraction module decide which parts of metadata to export and how to export them.

For example, for making a music cue sheet, the user may listen to audio files used in a project, decide which ones contain music, weed out voiceover and special effects tracks which are not musical, and export one or more resulting export files to the host system. For an image example: a user could drill down to a view all still images used in a production and export the image data in one or more export files to the host system. For a GPS example: a user may wish to create a list of the GPS coordinates for all the video shot and used in the production.

In one example embodiment, the data extraction module creates digital fingerprints of audio tracks in a project as described above, and exports to the resulting files which are then exported, then matched and turned into a cue sheet. In other examples, other automated techniques can be included to recognise faces, images, voices, moods, product placement opportunities, etc.

Also, in the above description, fingerprints (representations) of individual media files as providing in individual tracks are generated. However, in addition fingerprints representative of multiple tracks can be generated and included in the exported files. Indeed, a fingerprint of a complete project can be generated to represent the project, for example in the form to be broadcast. Such a fingerprint of part of or an entire project or programme can then be used to identify instances when the project or programme is broadcast.

An embodiment of the invention enables information to be extracted at a granular and more specific level than possible via the interfaces provided in conventional craft tools.

An embodiment facilitates the translation, organising and modifying of metadata and content to different standards for the purpose of delivering the information and content.

An embodiment of the invention enables automation of an identification process at an editing stage of the project, e.g., using pattern recognition technology on the media files in the edit rather than in a finished edit.

Aspects of the subject matter described herein are set out in the following numbered clauses:

1. A computer-implemented method of generating a metadata record representative of media content from at least one sequence of at least one project from at least one craft tool, the craft tool defining a project by storing media content of a project sequence in a plurality of tracks and/or project bins and storing metadata relating to the project sequence, the method comprising, at a first computer system:
   extracting stored metadata from the project sequence;
   extracting stored media content from at least one track and/or project bin of the project sequence;
   processing the extracted media content to generate a representation of the extracted media content; and
   producing an output including the extracted metadata and the representation of the extracted media content.
2. The method of clause 1, comprising performing pattern recognition with respect to stored reference data using the representation of the extracted media content to determine metadata identifying the extracted media content.
3. The method of clause 2, wherein the representation of the extracted media content is a Fourier transform of the extracted media content and wherein the processing includes generating a Fourier transform of the extracted media content.
4. The method of clause 2 or clause 3, wherein the stored reference data comprises representations of respective reference works each associated with metadata identifying the reference works.
5. The method of clause 4, wherein the stored reference data comprises Fourier transforms of respective reference works each associated with metadata identifying the reference works.
6. The method of any one of clauses 3 to 5, wherein producing the output includes generating a file comprising the extracted metadata and the determined metadata identifying the media content.
7. The method of clause 1, wherein producing the output includes generating a file comprising the extracted metadata and the representation of the extracted media content.
8. The method of clause 7, wherein producing the output includes transmitting the extracted metadata and the representation of the extracted media content to a second computer system.
9. The method of clause 8, wherein producing the output includes encrypting the extracted metadata and the representation of the extracted media content prior to transmission to the second computer system.
10. The method of clause 8 or clause 9, comprising performing pattern recognition at the second computer system with respect to stored reference data using the representation of the extracted media content to determine metadata identifying the extracted media content.
11. The method of clause 10, wherein the representation of the extracted media content is a Fourier transform of the extracted media content and wherein the processing includes generating a Fourier transform of the extracted media content.
12. The method of clause 10 or clause 11, wherein the stored reference data comprises representations of respective reference works each associated with metadata identifying the reference works.
13. The method of clause 12, wherein the stored reference data comprises Fourier transforms of respective reference works each associated with metadata identifying the reference works.
14. The method of any one of clauses 11 to 13, wherein the outputting includes generating a metadata record file comprising the extracted metadata and the determined metadata identifying the media content.
15. The method of any one of the preceding clauses, wherein the stored media content comprises at least one of audio, text, image and video.
16. The method of any one of the preceding clauses, wherein the metadata includes metadata identifying a rights holder in respect of the stored media content.
17. The method of any one of the preceding clauses, wherein the representation of the extracted media content includes a representation of one or more of faces, images, voices, moods, product placement opportunities, a plurality of tracks of a project, a complete project.
18. The method of clause 8 or clause 9, comprising performing pattern recognition at the second computer system with respect to stored reference data using the representation of the extracted media content, and where a match is not found, updating the stored reference data.
19. The method of any one of the preceding clauses, wherein the metadata record comprises a cue sheet.
20. A cue sheet generated by the method of any one of the preceding clauses.
21. A computer program product comprising program code operable to carry out the steps of the method of any one of clauses 1 to 19.
22. The computer program product of clause 21, comprising at least one computer readable medium, the computer readable medium carrying the program code.
23. A data extraction module for a first computer system that comprises a processor and storage and is configured to implement a craft tool, the craft tool being operable to define a project using stored media content of at least one sequence of at least one project in a plurality of tracks and/or project bins and stored metadata relating to the project sequence, the data extraction module being configured to:
extract stored metadata from the project sequence;
extract stored media content from at least one track and/or project bin of the project sequence;
process the extracted media content to generate a representation of the extracted media content; and
produce an output including the extracted metadata and the representation of the extracted media content.

24. The data extraction module of clause 23, wherein the representation of the extracted media content is a Fourier transform of the extracted media content and wherein the data extraction module comprises a processing module configured to process the extracted media content by generating a Fourier transform of the extracted media content.

25. The data extraction module of clause 23 or clause 24, comprising an output module configured to produce the output by generating a file comprising the extracted metadata and the representation of the extracted media content.

26. The data extraction module of any of clauses 23 to 25, comprising an output module configured to produce the output by transmitting the extracted metadata and the representation of the extracted media content to a second computer system.

27. The data extraction module of any one of clauses 23 to 26, wherein the stored media content comprises at least one of audio, text, image and video.

28. The data extraction module of clause 26 or clause 27, wherein the output module is configured to encrypt the extracted metadata and the representation of the extracted media content prior to transmission to the second computer system.

29. The data extraction module of any one of clauses 23 to 28, wherein the representation of the extracted media content includes a representation of one or more of faces, images, voices, moods, product placement opportunities, a plurality of tracks of a project, a complete project.

30. A system comprising a first computer system comprising a processor and storage, the first computer system implementing a craft tool, the craft tool operable to define a project using stored media content of at least one sequence of at least one project in a plurality of tracks and/or project bins and stored metadata relating to the project sequence, the first computer system further including at least one data extraction module configured to:
extract stored metadata from the project sequence;
extract stored media content from at least one track and/or project bin of the project sequence;
process the extracted media content to generate a representation of the extracted media content; and
produce an output including the extracted metadata and the representation of the extracted media content.

31. The system of clause 30, wherein data extraction module is configured to produce the output by transmitting the extracted metadata and the representation of the extracted media content to a second computer system.

32. The system of clause 31, wherein data extraction module is configured to produce the output by generating a file comprising the extracted metadata and the representation of the extracted media content and transmitting the file to a second computer system.

33. The system, of clause 32, wherein the data extraction module is configured to encrypt the file prior to transmission to the second computer system.

34. The system of any one of clauses 31 to 33, further comprising the second computer system, the second computer system being configured to perform pattern recognition with respect to stored reference data using the representation of the extracted media content to determine metadata identifying the extracted media content 35. The system of clause 34, wherein the second computer system is operable, wherein pattern recognition at the second computer system with respect to stored reference data using the representation of the extracted media content does not identify a match, to update the stored reference data.

36. The system of any one of clauses 30 to 35, wherein the representation of the extracted media content is a Fourier transform of the extracted media content and wherein the data extraction module is configured to process the extracted media content including generating a Fourier transform of the extracted media content.

37. The system of any one of clauses 34 to 36, wherein the stored reference data comprises representations of respective reference works each associated with metadata identifying the reference works.

38. The system of clause 37, wherein the stored reference data comprises Fourier transforms of respective reference works each associated with metadata identifying the reference works.

39. The system of any one of clauses 30 to 38, wherein the outputting includes generating a metadata report file comprising the extracted metadata and the determined metadata identifying the media content.

40. The system of any one of clauses 30 to 39, wherein the stored media content comprises at least one of audio, text, image and video.

41. The system of any one of clauses 30 to 40, wherein the metadata includes metadata identifying a rights holder in respect of the stored media content.

42. The data extraction module of any one of clauses 30 to 41, wherein the representation of the extracted media content includes a representation of one or more of faces, images, voices, moods, product placement opportunities, a plurality of tracks of a project, a complete project.

43. The system of any one of clause 30 to 44, wherein the system is operable to generate a metadata record in the form of a cue sheet.

Although particular embodiments and implementations have been described, it is noted that these are provided by way of example on, and that other embodiment and implementations can be envisaged within the scope of the claims.

What is claimed is:

1. A computer-implemented method of analyzing a media project defined by a craft tool, the method comprising:
receiving a file for the media project defined by the craft tool, wherein the craft tool is a computer-implemented tool for audio and/or visual editing, the media project includes a plurality of media items in at least one of a plurality of tracks and project bins, and the received file comprises media content extracted from the plurality of media items;
comparing a representation generated from media content extracted from a particular one of the plurality of media items to reference representations in a database of reference items to identify a match, wherein:
the reference items in the reference database include associated reference metadata,
the representation generated from the media content extracted from the particular media item of the media project is a fingerprint generated from the media content extracted from the particular media item of the media project, and the corresponding reference item comprises a representation in the form of a fingerprint generated from a reference work and associated metadata identifying the reference work; and in response to identifying a corresponding reference item in the reference database for which the representation generated from the content extracted from the particular media item matches the reference representation for the corresponding reference item, using the associated reference metadata to identify the media content extracted from the particular media item.

2. The method of claim 1, wherein the comparing comprises performing pattern recognition between the representation generated from the media content extracted from the particular one of the plurality of media items to reference representations in the database of reference items to identify the match.

3. The method of claim 1, wherein said media content extracted from the particular one of the plurality of media items is at least one of video, image, text or audio media, and wherein the representation of said media content from the particular one of the plurality of media items is a representation of said at least one of video, image, text or audio media.

4. The method of claim 3, wherein the representation of said media content from the particular media item is a representation of at least one of faces, images, voices, moods, and product placement opportunities from said video, image, text or audio media.

5. The method of claim 1, wherein:

the fingerprint generated from the media content extracted from the particular media item of the media project is a Fourier transform generated from the media content extracted from the particular media item of the media project; and the corresponding reference item comprises a representation in the form of a Fourier transform generated from the reference work and associated metadata identifying the reference work.

6. The method of claim 1, wherein the received file for the media project defined by the craft tool further includes the representation generated from the media content extracted from the particular media item of the media project.

7. The method of claim 1, wherein the received file for the media project defined by the craft tool further includes metadata extracted from the media project defined by the craft tool.

8. The method of claim 7, further comprising:

adding a reference item to the reference database when no item in the reference database is identified that has a reference representation that matches the representation generated from the content extracted from the particular media item, the added reference item including the representation generated from the media content extracted from the particular media item and metadata extracted from the received file and associated with the media content extracted from the particular media item.

9. The method of claim 1, further comprising outputting a metadata record file comprising the associated reference metadata to identify the media content extracted from the particular media item of the media project.

10. The method of claim 9, wherein the metadata record file comprises a cue sheet including metadata identifying a rights holder in respect of the media content.

11. The method of claim 9, wherein the metadata record file includes metadata identifying at least one of: a face, an image, a voice, a mood, and a product placement opportunity.

12. A system comprising at least one computer server, the system configured to:

receive a file for a media project defined by a craft tool, wherein the craft tool is a tool for audio and/or visual editing implemented by a client system, the media project includes a plurality of media items in at least one of a plurality of tracks and project bins, and the received file comprises media content extracted from media items of the media project;

compare a representation generated from media content extracted from a particular one of the plurality of media items of the media project to reference representations in a database of reference items to identify a match, wherein:

the reference items in the reference database comprise reference representations and associated reference metadata, the representation generated from the media content extracted from the particular media item of the media project is a fingerprint generated from the media content extracted from the particular media item of the media project, and the corresponding reference item comprises a representation in the form of a fingerprint generated from a reference work and associated metadata identifying the reference work; and use, in response to identifying a corresponding item in the reference database for which the representation generated from the content extracted from the particular media item matches the reference representation in the corresponding item in the reference database, the associated reference metadata to identify the media content extracted from the particular media item of the media project.

13. The system of claim 12, further configured to compare a representation generated from media content extracted from the particular media item of the media project to reference representations in a database of reference items to identify a match by performing pattern recognition between the representation generated from the media content extracted from the particular media item of the media project to reference representations in the database of reference items to identify a match.

14. The system of claim 12, wherein the received file for the media project defined by the craft tool further includes metadata extracted from the received file.

15. The system of claim 12, further configured to add a reference item to the reference database when no item in the reference database is identified that has a reference representation that matches the representation generated from the content extracted from the particular media item, the added reference item including the representation generated from the media content extracted from the particular media item and metadata extracted from the project and associated with said media content extracted from the particular media item.

16. The system of claim 12, wherein the corresponding reference item comprises a representation in the form of a fingerprint generated from the corresponding reference work and associated metadata identifying the reference work.

17. The system of claim 12, wherein the corresponding reference item comprises a representation in the form of a Fourier transform generated from the corresponding reference work and associated metadata identifying the reference work.

18. The system of claim 12, wherein the received file for the media project defined by the craft tool further includes at least one of the representation generated from the media content extracted from the particular media item of the media project, or metadata extracted from the media project defined by the craft tool.

19. The system of claim 12, further configured to output a metadata record file comprising the associated reference metadata to identify the media content extracted from the particular media item of the media project.

20. A system comprising at least one computer server, the system configured to:
receive a file for a media project defined by a craft tool, wherein the craft tool is a tool for audio and/or visual editing implemented by a client system, the media project includes a plurality of media items in at least one of a plurality of tracks and project bins, and the received file comprises media content extracted from media items of the media project;
compare a representation generated from media content extracted from a particular one of the plurality of media items of the media project to reference representations in a database of reference items to identify a match, wherein the reference items in the reference database comprise reference representations and associated reference metadata; and
use, in response to identifying a corresponding item in the reference database for which the representation generated from the content extracted from the particular media item matches the reference representation in the corresponding item in the reference database, the associated reference metadata to identify the media content extracted from the particular media item of the media project;
wherein the system is further configured to add a reference item to the reference database when no item in the reference database is identified that has a reference representation that matches the representation generated from the content extracted from the particular media item, the added reference item including the representation generated from the media content extracted from the particular media item and metadata extracted from the project and associated with said media content extracted from the particular media item.

* * * * *